United States Patent

Gamell

[11] Patent Number: 5,118,961
[45] Date of Patent: Jun. 2, 1992

[54] TURBINE GENERATOR

[75] Inventor: Joseph A. Gamell, Minneapolis, Minn.

[73] Assignee: S & W Holding, Inc., Prior Lake, Minn.

[21] Appl. No.: 582,673

[22] Filed: Sep. 14, 1990

[51] Int. Cl.$^5$ .................................... F02C 6/00
[52] U.S. Cl. .................................. 290/52; 415/90; 60/39.35
[58] Field of Search .................... 290/52; 415/90

[56] References Cited

U.S. PATENT DOCUMENTS

| | | | |
|---|---|---|---|
| 2,743,375 | 4/1956 | Parker | 290/52 |
| 2,984,751 | 5/1961 | Cliborn | 290/52 |
| 3,024,366 | 3/1962 | Yanagimachi | 290/2 |
| 3,039,007 | 6/1962 | Williams et al. | 290/52 |
| 3,157,793 | 11/1964 | Adkins | 290/52 |
| 3,233,164 | 2/1966 | Tyler | |
| 3,800,528 | 4/1974 | Gamell | 60/227 |
| 3,861,371 | 1/1975 | Gamell | 123/143 B |
| 3,886,732 | 6/1975 | Gamell | 60/39.35 |
| 3,906,188 | 9/1975 | Gamell | 392/391 |
| 3,935,847 | 2/1976 | Gamell | 123/565 |
| 3,935,848 | 2/1976 | Gamell | 123/565 |
| 3,938,905 | 2/1976 | Wadensten | 415/92 |
| 3,948,053 | 4/1976 | Gamell | 60/618 |
| 3,948,235 | 4/1976 | Gamell | 75/640 |
| 3,967,914 | 7/1976 | Gamell | 415/90 |
| 4,003,672 | 1/1977 | Gamell | 415/71 |
| 4,006,591 | 2/1977 | Cervenka | 60/39.35 |
| 4,232,991 | 11/1980 | Gamell | 415/90 |
| 4,293,777 | 10/1981 | Gamell | 290/52 |
| 4,307,574 | 12/1981 | Gamell | 60/676 |
| 4,336,856 | 6/1982 | Gamell | 60/39.75 |
| 4,347,034 | 8/1982 | Vigh | 415/92 |
| 4,378,195 | 3/1983 | Gamell | 419/90 |
| 4,397,146 | 8/1983 | Vigh | 60/39.25 |
| 4,935,650 | 6/1990 | Hannan, III | 290/52 |

Primary Examiner—A. D. Pellinen
Assistant Examiner—Lawrence E. Colbert
Attorney, Agent, or Firm—Palmatier & Sjoquist

[57] ABSTRACT

A turbine generator with a rotor having magnets secured in a receptacle shaped portion and spinning about a stationary core to produce electricity. Jets of fluid impinge tangentially upon a circumferential roughened surface of the rotor and are spaced such that a fanning out of each of the impinging fluid streams is minimized by its adjacent upstream fluid stream to transfer a greater force to the rotor.

23 Claims, 2 Drawing Sheets

TURBINE GENERATOR

The present invention relates to turbines and generators and, more particularly, to turbines with integrated generators.

BACKGROUND OF THE INVENTION

The prior art includes a variety of turbines having integrated generators. The Gamell U.S. Pat. No. 4,293,777 discloses a turbine with a hollow rotor in which are disposed the elements of an electric generator. The Hannan U.S. Pat. No. 4,935,650 discloses a fluid driven rotor with spaced apart ferromagnetic discs which cooperate with cavities of a ferromagnetic stator to generate electrical power. The Cliborn U.S. Pat. No. 2,984,751 discloses a rotor carrying an armature element which cooperates with exteriorly mounted stationary field elements. The Williams U.S. Pat. No. 3,039,007 discloses a turbine wheel having a shaft which mounts a permanent magnet for being rotatably driven inside a stator steel core. The Parker U.S. Pat. No. 2,743,375 discloses a turbo-generator having rotating bladed discs alternating with stationary discs; each of the discs carry cooperating flat radial pole-pieces and windings. The Adkins U.S. Pat. No. 3,157,793 includes stator discs circumferentially disposed about rotor discs which have magnetic poles placed about their peripheries.

One fluid source for exploiting integrated turbine generators is natural gas. At the well head, natural gas may flow from the earth's crust at high pressure to drive a turbine to produce electricity. Hence, electricity is available at no cost on sites such as oil platforms at sea. Turbine generators may also be operated at no cost at pressure reduction stations for natural gas pipelines. Such stations are typically located in metropolitan areas where gas pressure is released from a higher pressure for transportation in the pipeline to a lower pressure for business or residential use.

SUMMARY OF THE INVENTION

A feature of the present invention is the provision in a fluid driven turbine generator with a rotor driven by fluid jets impinging on a circumferential roughened surface, of a receptacle shaped portion of the rotor having a first electric generator element which spins about a stationary second electric generator element to produce electricity.

Another feature is the provision in such a turbine generator, of the core or transformer element being stationary and fixed to the housing.

Another feature is the provision in such a turbine generator, of the magnetic element being secured to and spinning with the receptacle shaped portion of the rotor.

Another feature is the provision in such a turbine generator, of the magnetic element being secured to an inner surface of the receptacle shaped portion of the rotor and spinning about the core element which extends partially in the receptacle shaped portion Another feature is the provision in such a turbine generator, of the fluid jets impinging tangentially upon the circumferential roughened surface to minimize a fanning out of respective adjacent fluid jets Another feature is the provision in such a turbine generator, of the circumferential roughened surface and magnetic element being axially offset relative to each other.

An advantage of the present invention is simplicity. The present turbine generator includes a minimum of parts which are easily formed. The receptacle shaped rotor and its housing are especially easily fabricated. Accordingly, the turbine generator is easy to assemble, install, operate, and maintain.

Another advantage is compactness. The present turbine generator occupies a minimum of space while generating 100 to 500 watts. One intended use of the turbine generator is on oil platforms where space is critical.

Another advantage is that a combustible fluid such as natural gas may be utilized as a driving force because the turbine generator produces electricity in a brushless fashion.

Another advantage is that use of fluid pressure is optimized. The turbine generator is driven by fluid jets impinging tangentially on a roughened surface. While a portion of one jet stream impinges on the roughened surface to transfer a driving force to the rotor, another portion flows across the roughened surface to subsequently fan out before contacting its adjacent downstream jet. When the upstream fanned-out jet stream contacts the downstream jet, the fanned-out portion of the upstream jet applies a greater pressure about the downstream jet to thereby preclude a fanning-out or expansion of the downstream jet before its impinges on the roughened surface. The downstream jet therefore transfers a greater force to the roughened surface.

DETAILED DESCRIPTION OF THE PREFERRED EMBODIMENT

Figure 1:
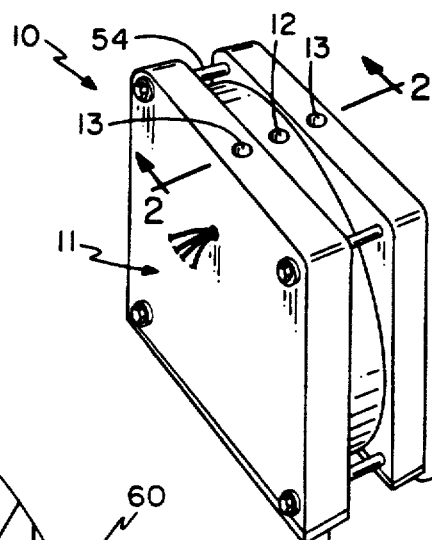
FIG. 1 is a perspective view of the present turbine generator.
Figure 3:
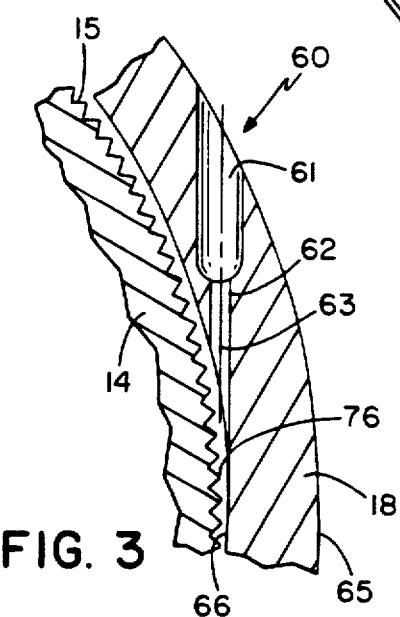
FIG. 3 is an enlarged partial view of a jet orifice of the turbine generator.
Figure 4:
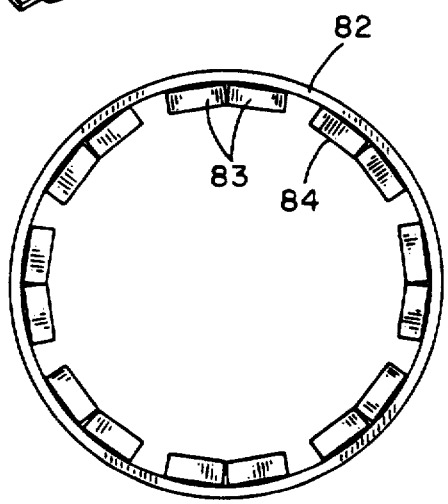
FIG. 4 is an elevation view of the ceramic magnets mounted on a tubular mounting ring.
Figure 5:
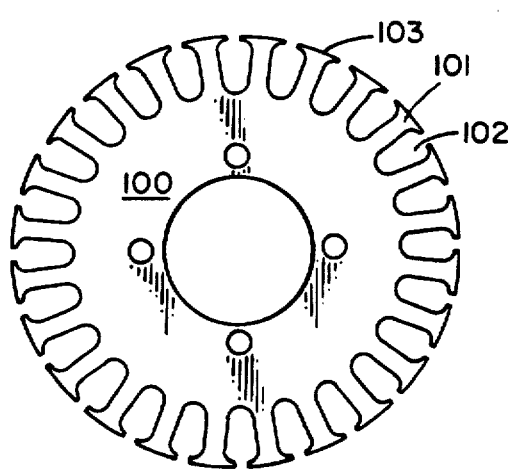
FIG. 5 is an elevation view of a portion of the stationary core of the turbine generator.
Figure 6:
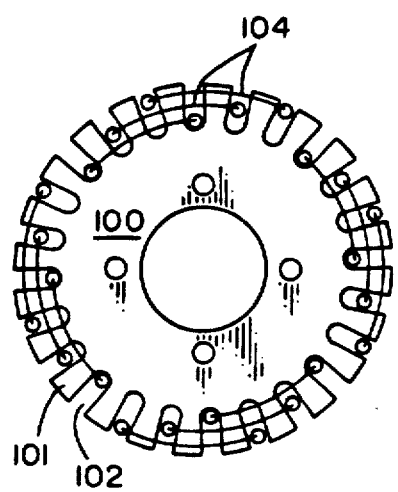
FIG. 6 is a schematic view of a portion of the stationary core of the turbine generator.
Figure 2:
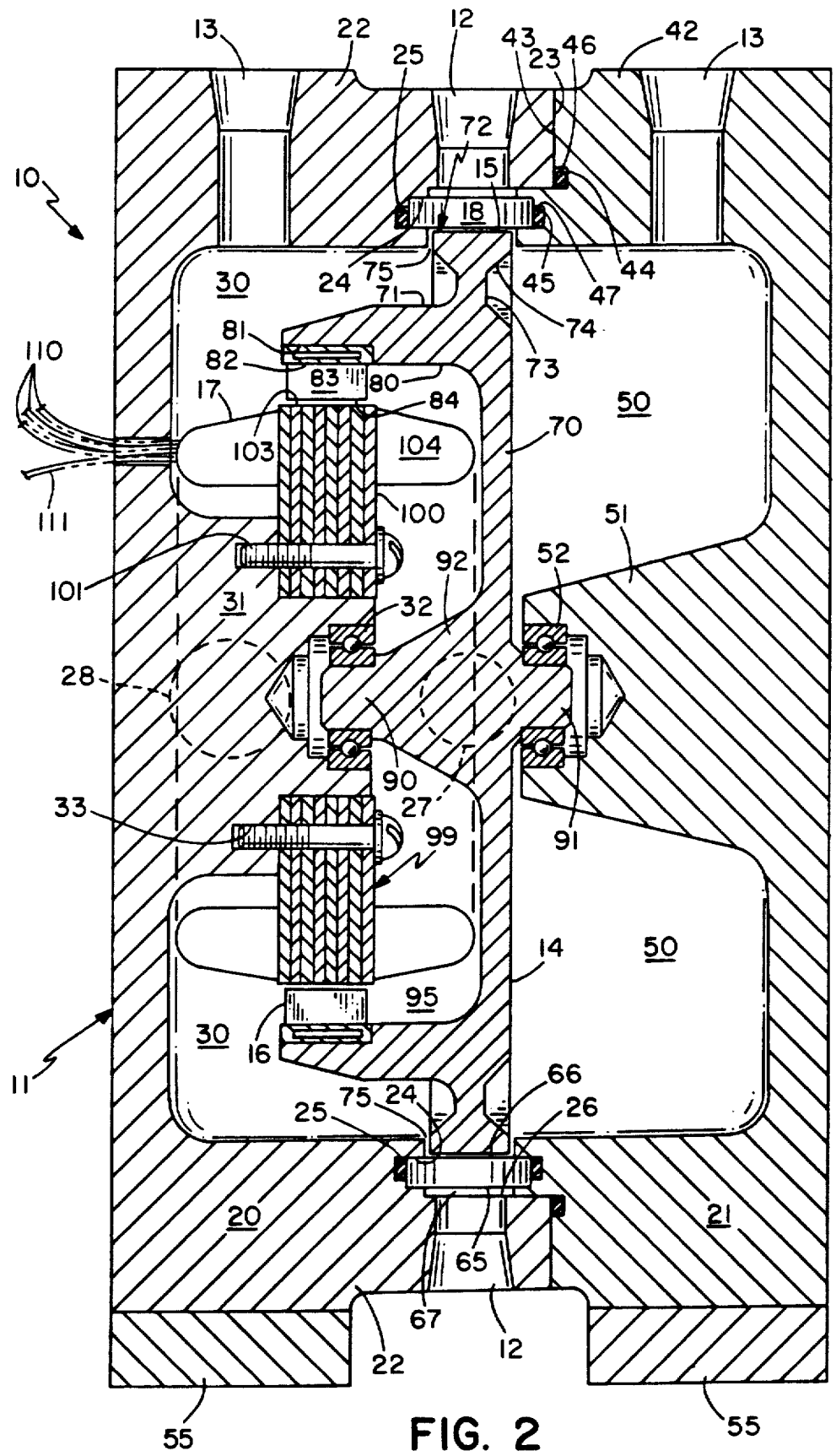
FIG. 2 is a detail section view at lines 2—2 of FIG. 1.

As shown in FIGS. 1 and 2, the present turbine generator is generally indicated by the reference numeral 10. It includes as its principal components a housing 11 with a pair of fluid inlets 12 and a pair of fluid outlets 13, a rotor 14 with a roughened circumferential surface 15 and a magnetic element 16, and a core 17. A nozzle ring 18 is fixed in the housing 11 about the rotor 14. Fluid such as natural gas applied to the inlet 12 impinges upon the circumferential roughened surface 15 to drive the rotor 14 and magnetic element 16 about the core 17 to produce electricity.

More particularly, housing 11 includes a pair of front and back housing portions 20, 21. The front housing portion 20 includes a flange 22 in which the pair of fluid inlets 12 and one of the fluid outlets 13 are formed. The inlets 12 and outlets 13 are threaded to be coupled to nozzles of hoses conveying fluid to and from the turbine generator 10. The flange 22 includes an annular sealing surface 23 for bearing against housing portion 21. The flange 22 further includes a recess 24 for receiving an O-ring 25 and side portion of the nozzle ring 18. Flange 22 further includes an annular surface 26 running between the inlets 12 and parallel to the nozzle ring 18. Alternative fluid inlet 27 and fluid outlet 28 are shown in phantom in FIG. 2.

Front housing portion 20 further includes an annular shaped cavity 30 formed about a core and rotor concentric mount 31. The mount 31 includes a rotor bearing 32 and threaded bores 33. Fluid outlet 13 formed in housing portion 20 extends from the cavity 30 to the exterior of the housing 11.

Back housing portion 21 includes a flange 42 in which the other fluid outlet 13 is formed. The flange 42 includes an annular sealing surface 43 and a pair of annular recesses 44, 45 in which respective O-rings 46, 47 are disclosed. Surface 43 runs parallel to surface 23 such that surface 43 and O-ring 46 confront and bear against annular surface 23 of housing portion 20 to provide a fluid-tight seal. Annular recess 45 further receives a side portion of the nozzle ring 18 such that the nozzle 18 is fixedly and sealingly pinched in recesses 24, 45 between O-rings 25, 47 to provide a fluid-tight seal.

Back housing portion 21 further includes an annular cavity 50 formed about a rotor concentric mount 51. The mount 51 includes a rotor bearing 52. Fluid outlet 13 formed in housing portion 21 extends from the cavity 50 to the exterior of the housing 11.

Housing portions 20, 21 are joined by pin connectors 54 Each of the housing portions 20, 21 includes a foot 55 for supporting the housing 11 relative to a surface The nozzle ring 18 includes twelve apertures or jet orifices 60 for directing fluid tangentially upon the roughened surface 15. Each of the orifices 16 includes a larger aperture portion 16 with a concave end and a smaller aperture portion 62. An axis 63 of each of the orifices 60 is tangential to the roughened circumferential surface 15 of the rotor 14. The orifices 60 are equally spaced apart at 30° arcs.

The nozzle ring 18 further includes outer and inner circumferential surfaces 65, 66. Outer surface 65 runs parallel to housing annular surface 26 and is spaced therefrom to form a fluid passage 67. The nozzle ring 18 is disposed in the housing 11 such that the inlets 12 are spaced between two adjacent orifices 60 whereby fluid flowing inlets 12 impinges first on the outer peripheral surface 65 before flowing to the orifices 60.

The rotor 14 includes a disc-like base portion 70 and a side annular wall 71 to provide a receptacle shape to the rotor 14. The disk-like base portion 70 is disposed substantially in a common axial plane with an axial band portion of the roughened surface 15. An annular extension 72 integrally extending from the annular wall 71 includes a neck 73 and a flared head 74. The flared head 74 includes the circumferential roughened surface 15. Sides of the flared head 74 and neck 73 are spaced from the housing portions 20, 21 to provide a passage 75 for the flow of fluid from the roughened surface 15 to the cavities 30, 50 and subsequently to the outlets 13.

The roughened surface 15 includes a plurality of teeth 76 knurled in a straight line pattern transversely on the head 74. Other patterns are shown in the Gamell U.S. Pat. No. 4,293,777.

The annular wall 71 includes an inner surface with a shoulder 81 which mounts an annular steel tubing 82. The tubing 82 serves as a mount for the magnetic element 16 which includes the typically sixteen ceramic magnets 83 disposed in pairs equally spaced at 45° from each other. The magnets 83 are typically secured on the tubing 82 with a hi-flex adhesive such as available from 3-M of Maplewood, Minnesota under order no. 2214. The magnets 83 of each of the pairs abut each other. Each of the magnets have an inner peripheral surface 84. The tubing 82 and its magnets 83 are offset axially from the roughened surface 15. The magnets 83 and the bearing 32 are disposed substantially in a common axial plane.

The rotor 14 further includes axial integral shaft end portions 90, 91 for cooperating with bearings 32, 52, respectively. Shaft end portion 90 is disposed as an integral part of an axial tapering shaft portion 92 which has greater sectional diameters than shaft end portions 90, 91 to provide strength to the rotor 14 and its shaft end portions 90, 91. Shaft portions 90, 92, base portion 70, and annular wall 71 form an annular receptacle-like cavity 95 for receiving a portion of the core 17.

The core 17 includes a laminated stationary stack 99 of disc-like steel armature plates 100 fashioned to the core mount 31 of housing portion 20 via pin connectors 101. Each of the armature plates 100 includes 24 radial projections 101 forming twenty-four slots 102. The laminated stack 99 further includes an outer circumferential surface 103. A winding 104 is secured in the slots 102 and extends transversely from the armature plates 100 into cavity 30, housing portion 20, and cavity 95 of rotor 14. The armature plates 100 are axially aligned with the magnets 83. The outer circumferential surface 103 of the laminated stack 99 is spaced from the inner peripheral surfaces 84 of the magnets 83 such that electricity is generated in a brushless fashion.

Three phase leads 110 and a neutral lead 111 extend from the winding 104. The leads 110, 111 exit the housing portion 20 via an aperture formed in the housing portion 20. The leads 110, 111 run into an electrical housing 115 secured to front housing portion 20.

The housing 11, including the housing portions 20, 21, nozzle ring 18, and feet 55, are typically formed of a stainless steel. Aluminum may also be utilized, especially in corrosive environments. The rotor 14 is also typically formed of a stainless steel, although aluminum ma be used.

In operation, nozzles of hoses conveying a fluid such as natural gas are threaded into inlets 12 of the turbine generator 10. Fluid flowing through the inlets 12 impinges first on the outer peripheral surface 65 of the nozzle ring 18 and subsequently flows to jet orifices 60 through annular passage 67. As fluid pressure builds in passage 67, fluid flows into aperture portion 61 of each of the jet orifices 60 and then into respective aperture portions 62 which direct streams or jets of fluid along axes 63 and tangentially across the circumferential roughened surface 15 to drive the rotor 14.

As the fluid jets impinge on the roughened surface 15, a portion of each of the fluid jets flows over the surface 15 without impinging and begins to spread out or fan out as it flows toward its adjacent downstream jet of fluid. When such a jet of fluid flows in the proximity of its downstream jet, it increases the fluid pressure about the downstream jet and thereby limits a spreading out or fanning out of the portion of the downstream jet flowing from the aperture portion 62 to the roughened surface 15. This jet portion impinging on the roughened surface 15 thus transfers a greater drag force to the roughened surface 15 and a greater rotational velocity to the rotor 14. Fluid flowing from the roughened surface 15 subsequently flows through passages 75 and into cavities 30, 50 and 95 and is conveyed by pressure out of the housing 11 through fluid outlets 13.

As the rotor 14 is driven by the fluid being impinged on the roughened surface 15, the ceramic magnets 83 spin about core 17 to generate electricity in a brushless fashion. Approximately 100 watts of alternating current is generated.

It should be noted that more than 400-500 watts of power may be generated by increasing the size of the turbine generator and including a laminated stack 99 with 25 or more plates 100. Furthermore, it should be noted that a receptacle like portion of the rotor 14 may extend into cavity 50 and that rotor mount 51 may reflect the shape of rotor mount 31 to secure an additional core 17.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention

What is claimed:

1. A fluid driven turbine generator comprising:
   a housing with a fluid inlet and outlet to allow fluid flow to and from the turbine generator;
   a rotor in the housing and having a circumferential roughened surface, the rotor being driven by the fluid being applied to the fluid inlet and roughened surface;
   electric generator means for producing electricity and including a core element and a magnetic element, one of the elements being stationary relative the housing and the other element secured to and spinning with the rotor; and
   the rotor comprising a receptacle shaped portion, one of the elements secured to the receptacle shaped portion.

2. The turbine generator of claim 1, wherein the core element is stationary and fixed to the housing.

3. The turbine generator of claim 1, wherein the magnetic element is secured to and spins with the receptacle shaped portion.

4. The turbine generator of claim 1, wherein the receptacle shaped portion comprises an annular wall with an inner surface, and the magnetic element comprises a plurality of magnets fixed to the inner surface to spin about a portion of the core element which is fixed to the housing.

5. The turbine generator of claim 1, wherein the housing includes a plurality of apertures which are structured to direct the fluid in jets tangentially upon the circumferential roughened surface to minimize a fanning out of respective adjacent jets of fluid.

6. The turbine generator of claim 1, wherein the circumferential roughened surface and magnetic element are axially offset relative to each other.

7. A fluid driven turbine generator comprising:
   a housing with a fluid inlet and outlet to allow fluid flow to and from the turbine generator;
   a rotor in the housing and having a circumferential roughened surface, the rotor being driven by the fluid being applied to the fluid inlet and roughened surface;
   electric generator means for producing electricity and including a core element and a magnetic element, one of the elements being stationary relative the housing and the other element secured to and spinning with the rotor; and
   the circumferential roughened surface and the electric generator means being axially disposed relative to the rotor and offset in an axial direction relative to each other.

8. The turbine generator of claim 7, wherein the rotor comprises a disk-like base disposed substantially in a common axial plane with a portion of the circumferential roughened surface.

9. The turbine generator of claim 7, wherein the rotor comprises a pair of axial shaft ends mounted in respective bearings, one of the shaft ends and bearings being disposed substantially in a common axial plane with a portion of the electric generator means.

10. The turbine generator of claim 7, wherein the core element is stationary and fixed to the housing.

11. The turbine generator of claim 7, wherein the magnetic element is secured to and spins with the receptacle shaped portion.

12. The turbine generator of claim 7, wherein the receptacle shaped portion comprises an annular wall with an inner surface, and the magnetic element comprises a plurality of magnets fixed to the inner surface to spin about a portion of the core element which is fixed to the housing.

13. The turbine generator of claim 7, wherein the housing includes a plurality of apertures which are structured to direct the fluid in jets tangentially upon the circumferential roughened surface to minimize a fanning out of respective adjacent jets of fluid.

14. The turbine generator of claim 7, wherein the rotor comprises a receptacle shaped portion, one of the elements being secured to the receptacle shaped portion.

15. A fluid driven turbine generator comprising:
   a housing with a fluid inlet and outlet to allow fluid flow to and from the turbine generator;
   a rotor in the housing and being driven by the fluid being applied to the fluid inlet and rotor;
   a core element fixed to the housing;
   a magnetic element fixed to and spinning with the rotor; and
   the rotor comprising a receptacle-shaped portion with an annular wall having an inner surface, the magnetic element fixed to the inner surface, a portion of the core element extending into the receptacle-shaped portion and cooperating with the magnetic element to produce electricity.

16. The turbine generator of claim 15, wherein the rotor includes a circumferential roughened surface for being impinged by the fluid for driving the rotor.

17. The turbine generator of claim 16, wherein the housing includes a ring with apertures structured to direct the fluid in jets tangentially upon the roughened surface.

18. A fluid driven turbine generator comprising:
   a first housing portion with a fluid inlet, a first fluid outlet and a first bearing;
   a second housing portion with a second fluid outlet and a second bearing;
   a rotor mounted between the housing positions via the bearings and comprising:
   a) an outer circumferential roughened surface upon which the fluid is impinged to drive the rotor;
   b) a receptacle portion with an annular wall and a disk-like base portion, the annular wall extending from the base portion and having an inner surface, the disk-like base portion being disposed substantially in a common axial plane with a portion of the circumferential roughened surface; and c) a plurality of magnets secured to the inner surface and being axially offset from the roughened surface, the magnets and the bearings being disposed substantially in a common axial plane;

a nozzle ring secured between the housing portions and disposed between the inlet and the rotor, the ring having a plurality of apertures oriented to direct the fluid in jets tangentially upon the circumferential roughened surface of the rotor to drive the rotor; and a stationary core secured to one of the housing portions, at least a portion of the stationary core extending into the receptacle portion of the rotor and cooperating with the magnets to produce electricity.

19. The turbine generator of claim 1, wherein the rotor comprises a disk-like base disposed substantially in a common axial plane with a portion of the circumferential roughened surface.

20. The turbine generator of claim 1, wherein the rotor comprises a pair of axial shaft ends mounted in respective bearing, one of the shaft ends and bearings being disposed substantially in a common axial plane with a portion of the electric generator means.

21. The turbine generator of claim 15, wherein the rotor comprises a pair of axial shaft ends mounted in respective bearings, one of the shaft ends and bearings being disposed substantially in a common axial plane with a portion of the electric generator means.

22. A fluid driven turbine generator comprising:

a housing with a fluid inlet and outlet to allow fluid flow to and from the turbine generator;

a rotor in the housing and having a circumferential roughened surface, the rotor being driven by the fluid being applied to the fluid inlet and roughened surface;

electric generator means for producing electricity and including a core element and a magnetic element, the core element having a diameter, one of the elements being stationary relative the housing and the other element secured to and spinning with the rotor; and the rotor further comprising a disk-like base disposed substantially in a common axial plane with a portion of the circumferential roughened surface, the disk-like base having a diameter greater than the diameter of the core element.

23. A fluid driven turbine generator comprising:

a housing with a fluid inlet and outlet to allow fluid flow to and from the turbine generator, the housing having a pair of bearings;

a rotor in the housing and having a circumferential roughened surface, the rotor being driven by the fluid being applied to the fluid inlet and roughened surface;

electric generator means for producing electricity and including a core element and a magnetic element, one of the elements being stationary relative the housing and the other element secured to and spinning with the rotor; and the rotor further comprising a pair of axial shaft ends mounted in the bearings, one of the shaft ends and bearings being disposed substantially in a common axial plane with a portion of the electric generator means.

* * * * *